July 28, 1964  W. TURNER  3,142,111

ROTARY CUTTING TOOLS

Filed Jan. 22, 1963

INVENTOR:
WILLIAM TURNER
BY McGlew and Toren,
attorneys

United States Patent Office 3,142,111
Patented July 28, 1964

3,142,111
ROTARY CUTTING TOOLS
William Turner, Woodsetts, England, assignor to The Sheffield Twist Drill & Steel Company Limited, Sheffield, England, a company of Great Britain and Northern Ireland
Filed Jan. 22, 1963, Ser. No. 253,121
Claims priority, application Great Britain Jan. 29, 1962
10 Claims. (Cl. 29—105)

This invention relates to rotary cutting tools having inserted cutting blades (hereinafter referred to as "cutter bits") and is particularly applicable to such tools as milling cutters, boring, reaming and similar tools having generally a circular body which is slotted at circumferential intervals for the reception of the cutter bits which are clamped against a plurality of seating faces in said slots by retaining wedges, there being two seating faces in each slot disposed at an angle to one another for engagement by separate edge faces or separate parts of an edge face of a cutter bit and a third seating face for engagement by one of two parallel plane faces of the cutter bit which are at right angles to the edge face or faces, all of said seating faces being so arranged as to impart to the cutter bits the requisite rake angles and cutting clearances for effective operation of the tool upon a workpiece.

An object of this invention is to provide a rotary cutting tool of the kind hereinbefore defined in which each slot is of tapering form in a direction away from the operative face of the tool and a removable cutter bit having two parallel plane faces at opposite sides thereof is disposed in the wide end of the slot with one of said plane faces alongside and engaging a seating face therefor formed by one longitudinal side wall of said slot, longitudinally extending serrations in the other longitudinal side wall of the slot, an insert fixedly secured in and closing the narrow end of said slot, a wedge at the wide end of the slot clamping the cutter bit therein, said clamping wedge and said insert having serrations intermeshing with the serrations of the serrated side wall, the inner end of the insert co-operating with the basal wall of the slot to provide separate seating and locating faces at an angle to one another for an edge face of the cutter bit, and the inner ends of the insert and the clamping wedge being spaced one from the other.

Another object of the invention is to provide that the serrated wedge is engageable with the serrated side wall of the cutter-bit accommodating slot at different heights with respect to said slot at the front of the cutter bit so as to constitute an adjustably positionable chip breaker.

Still another object is to provide that the insert constitutes a predeterminedly adjustable cutter bit-locating face.

When constructing a rotary cutting tool according to this invention, the wedge and cutter bit accommodating slots in the body thereof are cut therein as open-ended slots on an axis at whatever angle to the axis of the body they are required, the side walls of the slots converging in a direction away from the wedge entrant end thereof. A metal insert for each slot is then prepared for fitting the slot and having a greater length than the slot and this insert is temporarily fitted in said slot and then removed for the serrations to be cut in the one wall of the slot and in the mating face of the insert, after which said insert is divided transversely for one piece thereof to form the insert whose inner end constitutes the adjustably positionable cutter bit locating face and for the other piece to form the wedge, said other piece being suitably reduced to the required size. The metal insert having the cutter bit locating face is then entered into the slot for its inner end to form the cutter bit-locating face and any projecting portion thereof beyond the narrow end of the slot is machined off flush with the surface of the body, said insert being suitably made fast within said slot. The cutter bit and wedge can then be inserted and secured in position in the slot.

It is to be understood that the wedge is of an appropriate length that when driven home, its inner end is always spaced from the inner end of the insert which forms the cutter bit-locating face.

A drift can be inserted between the wedge and the insert for withdrawing the wedge when necessary for removing the cutter bit when necessary.

Alternatively, the chip-breaking face of the wedge may be provided with a pin engaging hole for the reception of a pin at the end of a lever for withdrawing the wedge which lever would be provided with a fulcrum pin engageable with a hole in the surface of the body whereby turning movement of the lever about its fulcrum pin would enable the wedge to be withdrawn.

The surface of the body immediately in front of the cutter bit, that is to say at the cutting side thereof, may be machined away to give adequate chip clearance.

The invention will be better understood from the following description and reference to the accompanying drawings of which:

FIGS. 1 and 2 are drawn on a slightly larger scale than FIGS. 3 to 6 although the milling cutter of FIGS. 1 and 2 is represented as being of a smaller diameter than the milling cutter shown in FIGS. 3 to 6.

Figure 1:
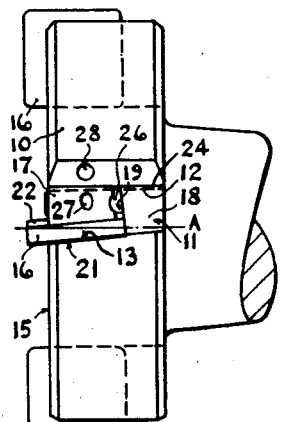
FIG. 1 is a side elevation of a half side and face milling cutter embodying the invention.
Figure 2:
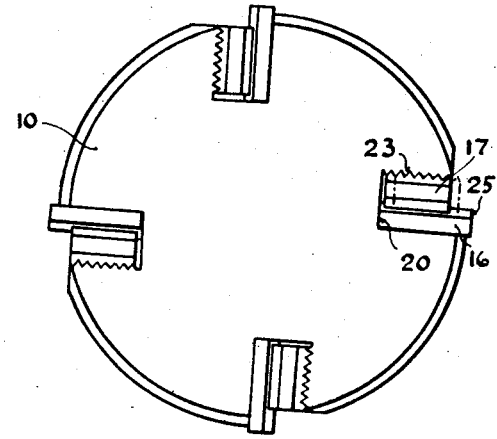
FIG. 2 is an end elevation thereof.
Figure 3:
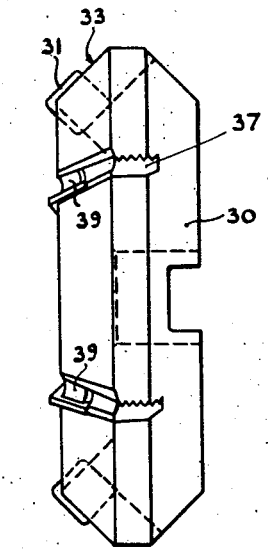
FIG. 3 is a side elevation of a face mill embodying the invention.
Figure 4:
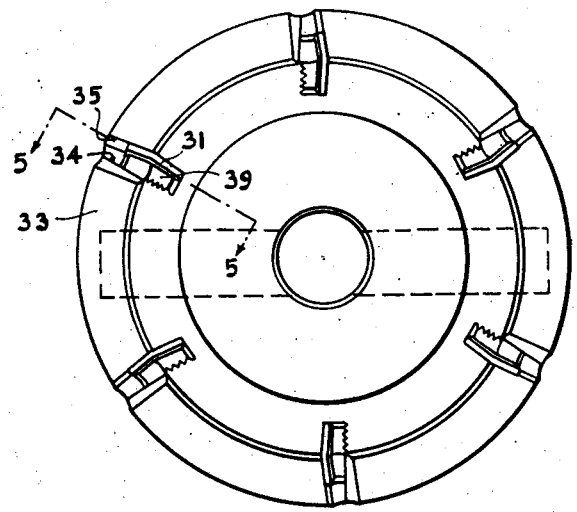
FIG. 4 is an end elevation thereof.
Figure 5:
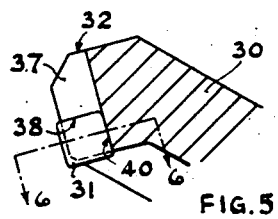
FIG. 5 is a sectional view on the line 5—5 in FIG. 4.
Figure 6:
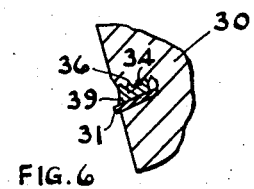
FIG. 6 is a sectional view on the line 6—6 in FIG. 5.

Referring now to FIGS. 1 and 2 of the drawings, 10 is the body of the milling cutter across the periphery of which four slots 11 are cut at circumferential intervals, the opposing longitudinal side walls 12, 13 of each slot converging so that the wide end thereof is disposed towards the face 15 of the body. The wall 13 of each slot is disposed at an angle to a plane A passing through the slot and containing the axis of the body.

Disposed in the wide end of each slot is a cutter bit 16 and a removable retaining wedge 17 therefor. An insert 18 is fixedly secured in the narrow end of the slot for the inner end of said insert to form a predeterminedly adjustably positioned locating face 19 for the cutter bit at an edge face thereof while the basal wall of the slot likewise forms a cutter bit seating face 20, also at an edge face thereof, said cutter bit seating by its one face 21 against the longitudinal side wall 13 of the slot 11 and the wedge 17 engaging the other face 22 of the cutter bit and fitting between it and the other longitudinal side wall 12 of the slot. The engaging faces of the wedge 17 and the longitudinal side wall 12 of the slot 11 are provided with intermeshing longitudinally extending serrations 23 whereby the cutter bit is effectively held in position.

The insert 18 is also provided with serrations 24 for intermeshing engagement with the serrations in the longitudinal side wall 12 of the slot 11.

It will be seen that the length of the wedge 17 is such as always to be spaced from the cutter bit-locating face 19 of the insert.

It will also be seen that the longitudinal side wall 13 of the slot co-operates with the cutter bit-locating face of the insert 19 in positioning the cutter bit 16 for the exposed cutting edge 25 thereof to be presented in advance of the operative face 15 of the milling cutter for effective operation of said cutting edge upon a workpiece.

The wedge 17 can be driven into position in the slot at different heights therein determined by the pitch of the serrations as shown in chain lines in FIG. 2 and said wedge also constitutes an adjustably positionable chip breaker in front of the cutter bit.

The wedge can be withdrawn when required by inserting a drift between the cutter bit-locating face 19 and a recess 26 in the inner face of said wedge.

Alternatively, an extraneous tool (not shown) having one pin for engaging an elongated hole 27 in the wedge and a second pin for engaging a hole 28 in the peripheral face of the body 10 can be used for withdrawing the wedge by using the tool as a lever with the hole 28 serving as a fulcrum point for the second pin about which fulcrum point the tool is pivotally swung for withdrawing the wedge.

Referring now to FIGS. 3, 4, 5 and 6 of the drawings, a face mill comprises a body 30 having six cutter bits 31, the operative cutting edges of which are set over at an angle of approximately 45° to the axis of the cutter. Said cutter bits are accommodated in respective slots 32 which are cut across a bevelled face 33 of the body 30, and opposing longitudinal side walls 34 and 35 of each slot converge towards the periphery of the body.

The longitudinal side walls 34 of the slots are provided with longitudinally extending serrations 36 and the narrow end of each slot is provided with an insert 37 having longitudinal serrations intermeshing with the serrations 36 in the side wall 34 of the slot, said insert being fixedly secured in its slot therein, one end of said insert providing a locating face 38 for a cutter bit 31 disposed within the wider end of the slot, adjacent said insert.

The cutter bits are retained in their respective slots by means of retaining wedges 39 which are also provided with the serrated surfaces for intermeshing engagement with the serrations 36 of the walls 34. As in the case of the previously described milling cutter of FIGS. 1 and 2 the wedges are of such a length that they can be driven into the wider ends of the slots to clamp the cutter bits tightly in position without abutting against the locating faces 38 of the inserts 37.

The locating face 38 of each insert 37 co-operates with the basal wall 40 of its slot 32 in positioning a cutter bit 31 with the extremity of its cutting edge presented axially in advance of the body 30, and the longitudinal side walls 35 of the slots are disposed so as to position the cutter bits with the correct rake angles.

Both of the embodiments described and illustrated are negative rake cutters, and since the cutter blades are of the reversible type and square in outline each blade has a total of eight available cutting edges which can be used in turn.

It is to be understood however that the cutter bits may be of circular or any suitable polygonal form and that in the case of a circular cutter bit the locating face therefor on the insert may be suitably rounded.

It will also be understood that if the cutter blades are specially formed, in other words are not of the reversible type, the slots in the body of the cutter may be disposed so as to present the cutter bits at a positive or neutral rake angle.

The milling cutters may be mounted for operation in any convenient maner, the first described embodiment being shown adapted for arbor mounting and the last described embodiment being shown adapted for direct spindle mounting.

What I claim is:

1. In a rotary cutting tool, a circular body having at circumferentially spaced intervals therein cutter bit-accommodating slots extending across an operative face of the body and tapering in width from one end to the other; a series of serrations extending across a side wall of each slot in a direction parallel to said operative face of the body; an insert fixedly secured in and closing the narrow end of each slot to provide a cutter bit locating face therein disposed at a predetermined angle to a basal wall of the slot; a cutter bit disposed in the wide end of each slot and abutting against a side wall of said slot opposite its serrated wall, against its basal wall and against the cutter bit locating face therein; and a wedge also disposed in the wide end of each slot, said wedge having a serrated face for engagement with the serrations of the slot and an opposite plane face for abutment against a plane face of the cutter bit disposed in said slot.

2. In a rotary cutting tool, a circular body having at circumferentially spaced intervals therein cutter bit-accommodating slots extending across an operative face of the body and tapering in width from one end to the other; a series of serrations extending across a side wall of each slot in a direction parallel to said operative face of the body; an insert fixedly secured in and closing the narrow end of each slot to provide a cutter bit locating face therein disposed at a right angle to a basal wall of the slot; a cutter bit disposed in the wide end of each slot and abutting against a side wall of said slot opposite its serrated wall, against its basal wall and against the cutter bit locating face therein; and a wedge also disposed in the wide end of each slot, said wedge having a serrated face for engagement with the serrations of the slot and an opposite plane face for abutment against a plane face of the cutter bit disposed in said slot.

3. In a rotary cutting tool, a circular body having at circumferentially spaced intervals therein cutter bit-accommodating slots extending across an operative face of the body and tapering in width from one end to the other; a series of serrations extending across a side wall of each slot in a direction parallel to said operative face of the body; an insert fixedly secured in and closing the narrow end of each slot to provide a cutter bit locating face therein disposed at a right angle to a basal wall of the slot; a cutter bit disposed in the wide end of each slot and abutting against a side wall of said slot opposite its serrated wall, against its basal wall and against the cutter bit locating face therein; and a wedge having a serrated face and an opposite plane face for insertion in the wide end of each slot in predetermined realization to an operative cutting edge of the cutter bit depending upon the interengagement of the serrations of said slot and of said wedge for the latter to act as an adjustably positionable chip breaker.

4. In a rotary cutting tool, a circular body having at circumferentially spaced intervals therein cutter bit-accommodating slots extending across an operative face of the body and tapering in width from one end to the other; a series of serrations extending across a side wall of each slot in a direction parallel to said operative face of the body; an insert fixedly secured in and closing the narrow end of each slot to provide a cutter bit locating face therein disposed at a right angle to a basal wall of the slot; a cutter bit disposed in the wide end of each slot, said cutter bit being of substantially square configuration and having parallel plane faces at opposite sides thereof to provide eight cutting edges positionable in turn in operative cutting relation to the body meanwhile as adjacent inoperatively positioned cutting edges abut against the basal wall of said slot and against the cutter bit locating face therein; and a wedge also disposed in the wide end of each slot, said wedge having a serrated face for engagement with the serrations of the slot and an opposite plane face for abutment against a plane face of the cutter bit disposed in said slot.

5. In a rotary cutting tool, a circular body having at circumferentially spaced intervals therein cutter bit-accommodating slots extending across an operative face of the body and tapering in width from one end of the other; a series of serrations extending across a side wall of each slot in a direction parallel to said operative face of the body; an insert fixedly secured in and closing the narrow end of each slot to provide a cutter bit locating face therein disposed at a right angle to a basal wall of the slot; a cutter bit disposed in the wide end of each slot, said cutter bit being of substantially square configuration and having parallel plane faces at opposite sides thereof to provide eight cutting edges positionable in turn in operative cutting relation to the body meanwhile as adjacent inoperatively positioned cutting edges abut against the basal wall of said slot and against the cutter bit locating face therein; and a wedge having a serrated face and an opposite plane face for insertion in the wide end of each slot in predetermined relation to an operative cutting edge of the cutter bit depending upon the interengagement of the serrations of said slot and of said wedge for the latter to act as an adjustably positionable chip breaker.

6. In a rotary cutting tool, a circular body having at circumferentially spaced intervals therein cutter bit-accommodating slots extending across an operative face of the body and tapering in width from one end to the other; a series of serrations extending across a side wall of each slot in a direction parallel to said operative face of the body; an insert fixedly secured in and closing the narrow end of each slot to provide a cutter bit locating face therein disposed at a predetermined angle to a basal wall of the slot; a cutter bit disposed in the wide end of each slot and abutting against a side wall of said slot opposite its serrated wall, against its basal wall and against the cutter bit locating face therein; and a wedge also disposed in the wide end of each slot, said wedge having a serrated face for engagement with the serrations of the slot and an opposite plane face for abutment against a plane face of the cutter bit disposed in said slot, and having an exposed hole in close adjacency to a similar hole in the body for the insertion of a pair of pins forming part of an extraneous tool for effective removal of the wedge.

7. In a rotary cutting tool, a circular body of generally cylindrical form having at circumferentially spaced intervals therein cutter bit-accommodating slots extending across its peripheral face in the general direction of its axis, said slots tapering in width from an operative cutting end of the body to the other end thereof; a series of serrations extending across a side wall of each slot in a direction parallel to the axis of the body; an insert fixedly secured in and closing the narrow end of each slot to provide a cutter bit locating face therein disposed at a right angle to a basal wall of the slot and normal to the axis of the body; a cutter bit of substantially square configuration disposed in the wide end of each slot and abutting against a side wall of said slot opposite its serrated wall, against its basal wall and against the cutter bit locating face therein for adjacent cutting edges of said cutter bit to be disposed respectively at right angles to and parallel to the axis of the body and to project respectively from the operative cutting end and the peripheral face of the body; and a wedge also disposed in the wide end of each slot, said wedge having a serrated face for engagement with the serrations of the slot and an opposite plane face for abutment against a plane face of the cutter bit disposed in said slot.

8. In a rotary cutting tool, a circular body of generally cylindrical form having at circumferentially spaced intervals therein cutter bit-accommodating slots extending across its peripheral face in the general direction of its axis, said slots tapering in width from an operative cutting end of the body to the other end thereof; a series of serrations extending across a side wall of each slot in a direction parallel to the axis of the body; an insert fixedly secured in and closing the narrow end of each slot to provide a cutter bit locating face therein disposed at a right angle to a basal wall of the slot and normal to the axis of the body; a cutter bit of substantially square configuration disposed in the wide end of each slot and abutting against a side wall of said slot opposite its serrated wall, against its basal wall and against the cutter bit locating face therein for adjacent cutting edges of said cutter bit to be disposed respectively at right angles to and parallel to the axis of the body and to project respectively from the operative cutting end and the peripheral face of the body; and a wedge having a serrated face and an opposite plane face for insertion in the wide end of each slot in predetermined relation to the operative cutting edge of the cutter bit projecting from the peripheral face of the body, depending upon the interengagement of the serrations of said slot and of said wedge for the latter to act as an adjustably positionable chip breaker.

9. In a rotary cutting tool, a circular body having a bevelled operative face at an operative cutting end of the body, said body having at circumferentially spaced intervals therein cutter bit-accommodating slots extending across said bevelled operative face and tapering in width towards the periphery of the body; a series of serrations extending across a side wall of each slot in a direction parallel to the bevelled operative face of the body; an insert fixedly secured in and closing the narrow end of each slot to provide a cutter bit locating face therein disposed at a right angle to a basal wall of the slot; a cutter bit disposed in the wide end of each slot and abutting against a side wall of said slot opposite its serrated wall, against its basal wall and against the cutter bit locating face therein for an operative cutting edge thereof to project from the bevelled operative face of the body; and a wedge also disposed in the wide end of each slot, said wedge having a serrated face for engagement with the serrations of the slot and an opposite plane face for abutment against a plane face of the cutter bit disposed in said slot.

10. In a rotary cutting tool, a circular body having a bevelled operative face at an operative cutting end of the body, said body having at circumferentially spaced intervals therein cutter bit-accommodating slots extending across said bevelled operative face and tapering in width towards the periphery of the body; a series of serrations extending across a side wall of each slot in a direction parallel to the bevelled operative face of the body; an insert fixedly secured in and closing the narrow end of each slot to provide a cutter bit locating face therein disposed at a right angle to a basal wall of the slot; a cutter bit disposed in the wide end of each slot and abutting against a side wall of said slot opposite its serrated wall, against its basal wall and against the cutter bit locating face therein for an operative cutting edge thereof to project from the bevelled operative face of the body; and a wedge having a serrated face and an opposite plane face for insertion in the wide end of each slot in predetermined relation to said operative cutting edge of the cutter bit depending upon the interengagement of the serrations of said slot and of said wedge for the latter to act as an adjustably positionable chip breaker.

References Cited in the file of this patent

UNITED STATES PATENTS

| | | |
|---|---|---|
| 1,077,271 | Gorton | Nov. 4, 1913 |
| 1,144,131 | Hunter | June 22, 1915 |
| 2,037,642 | Scribner | Apr. 14, 1936 |
| 2,264,299 | Crosby | Dec. 2, 1941 |

FOREIGN PATENTS

| | | |
|---|---|---|
| 617,874 | Germany | Mar. 3, 1933 |